United States Patent
Hornbostel et al.

(10) Patent No.: US 10,145,974 B2
(45) Date of Patent: Dec. 4, 2018

(54) EXPLORATION METHOD AND SYSTEM FOR DETECTION OF HYDROCARBONS FROM THE WATER COLUMN

(71) Applicants: Scott C. Hornbostel, Houston, TX (US); Homer C. Jones, Houston, TX (US); John Blum, Houston, TX (US)

(72) Inventors: Scott C. Hornbostel, Houston, TX (US); Homer C. Jones, Houston, TX (US); John Blum, Houston, TX (US)

(73) Assignee: ExxonMobil Upstream Research Company, Spring, TX (US)

(*) Notice: Subject to any disclaimer, the term of this patent is extended or adjusted under 35 U.S.C. 154(b) by 78 days.

(21) Appl. No.: 15/198,886

(22) Filed: Jun. 30, 2016

(65) Prior Publication Data

US 2017/0068011 A1    Mar. 9, 2017

Related U.S. Application Data

(60) Provisional application No. 62/214,425, filed on Sep. 4, 2015.

(51) Int. Cl.
G01V 1/30 (2006.01)
G01V 1/38 (2006.01)
G01V 1/36 (2006.01)

(52) U.S. Cl.
CPC ............... *G01V 1/38* (2013.01); *G01V 1/301* (2013.01); *G01V 1/303* (2013.01); *G01V 1/362* (2013.01); *G01V 1/364* (2013.01)

(58) Field of Classification Search
CPC . G01V 1/30; G01V 1/38; G01V 1/364; G01V 1/362; G01V 1/303; G01V 1/301
USPC .................................................. 367/24
See application file for complete search history.

(56) References Cited

U.S. PATENT DOCUMENTS

| | | | |
|---|---|---|---|
| 3,370,268 A | * | 2/1968 | Dobrin ............ G01V 1/364 346/33 C |
| 5,798,982 A | | 8/1998 | He et al. |
| 6,246,963 B1 | | 6/2001 | Cross et al. |
| 6,754,588 B2 | | 6/2004 | Cross et al. |
| 6,873,570 B2 | | 3/2005 | Zhu et al. |
| 7,328,107 B2 | | 2/2008 | Strack et al. |

(Continued)

FOREIGN PATENT DOCUMENTS

| | | |
|---|---|---|
| CN | 101644781 | 2/2010 |
| EP | 2 113 796 A1 | 11/2009 |

(Continued)

OTHER PUBLICATIONS

Anonymous (2015) "Seismic Water Bottom Anomalies Map Gallery" Retrieved from the Internet: https://www.boem.gov/Seismic-Water-Bottom-Anomalies-Map-Gallery/ [Retrieved on Jan. 11, 2017] 5 pages.

(Continued)

*Primary Examiner* — Daniel L Murphy
(74) *Attorney, Agent, or Firm* — ExxonMobil Upstream Research Company—Law Department

(57) ABSTRACT

A method for detecting hydrocarbons is described. The method includes obtaining seismic data associated with a body of water in a survey region, analyzing the seismic data to identify at least one noise indicator to produce a noise indicator image; and determining seepage locations by comparing the at least one noise indicator image to the seismic data.

24 Claims, 9 Drawing Sheets

(56) References Cited

U.S. PATENT DOCUMENTS

| | | |
|---|---|---|
| 8,045,417 B2 | 10/2011 | Levin |
| 8,219,320 B2 | 7/2012 | Saenger |
| 8,838,428 B2 | 9/2014 | Tapscott et al. |
| 8,867,311 B2 | 10/2014 | Rikoski |
| 8,873,337 B2 | 10/2014 | Rikoski |
| 8,879,357 B2 | 11/2014 | Rikoski |
| 9,013,952 B2 | 4/2015 | Muyzert et al. |
| 9,036,452 B2 | 5/2015 | Rikoski |
| 9,103,938 B2 | 8/2015 | Rikoski |
| 9,146,225 B2 | 9/2015 | Pottorf et al. |
| 2007/0265782 A1 | 11/2007 | Kleinberg et al. |
| 2008/0112266 A1 | 5/2008 | Aoyama |
| 2009/0150124 A1 | 6/2009 | Wilt et al. |
| 2009/0228255 A1 | 9/2009 | Levin |
| 2010/0153015 A1 | 6/2010 | Podladchikov et al. |
| 2014/0256055 A1 | 9/2014 | Pottorf et al. |
| 2014/0288853 A1 | 9/2014 | Dreyfus et al. |
| 2014/0303895 A1 | 10/2014 | Dreyfus et al. |
| 2014/0378319 A1 | 12/2014 | Regberg et al. |
| 2015/0127313 A1 | 5/2015 | Lawson et al. |
| 2015/0185342 A1* | 7/2015 | van Groenestijn .... G01V 1/364 702/14 |
| 2015/0253443 A1 | 9/2015 | Hornbostel et al. |

FOREIGN PATENT DOCUMENTS

| | | |
|---|---|---|
| RU | 2434250 | 6/2010 |
| WO | 2013/071185 | 5/2013 |
| WO | 2013/148442 | 10/2013 |

OTHER PUBLICATIONS

McConnell et al (2008), "Seep-hunting in deepwater for frontier basin prospectively assessment" World Oil, vol. 228, No. 4; pp. 111-117.

Macdonald, I.R., et al., (2002), "Transfer of Hydrocarbons From Natural Seeps to the Water Column and Atmosphere", Geofluids, vol. 2, pp. 95-107.

Holbrook, W.S., et al., (2003), "Thermohaline Fine Structure in an Oceanographic Front From Seismic Reflection Profiling", Science, vol. 301, pp. 821-824.

Ruddick, B., et al., (2009), "Water Column Seismic Images as Maps of Temperature Gradient", Oceanography, vol. 22 (1), pp. 192-205.

Hildebrand, J.A., et al., (2012), "Seismic Imaging of the Water-Column Deep Layer Associated With the Deepwater Horizon Oil Spill", Geophysics, vol. 77 (2), pp. EN11-EN16.

Marino, I.K., et al., (2013), "Processing of High-Resolution, Shallow Seismic Profiles, Guanabara Bay—Rio De Janeiro State, Brazil", Revista Brasileira de Geofisica, vol. 31(4), pp. 579-594.

Bansal, R., et al., (2005), "Diffraction Enhancement in Prestack Seismic Data", Geophysics, vol. 70, No. 3, pp. V73-V79.

Judd, A., et al., (1997), "Contributions to Atmospheric Methane by Natural Seepages on the UK Continental Shelf", Marine Geology, vol. 137, pp. 165-189.

IP.com Journal (2012), "Detection of Underwater Hydrocarbon and Related Fluid Seeps Using Reflection Seismic Data", 3 pgs.

Kuscu, I., et al., (2005), "Seafloor Gas Seeps and Sediment Failures Triggered by the Aug. 17, 1999 Earthquake in the Eastern Part of the Gulf of Izmit, Sea of Marmara, NW Turkey", Marine Geology, vol. 215, pp. 193-214.

Rollet, N., et al., (2006), "Characterisation and Correlation of Active Hydrocarbon Seepage Using Geophysical Data Sets: An Example From the Tropical, Carbonate Yampi Shelf, Northwest Australia", Marine and Petroleum Geology, vol. 23, pp. 145-164.

Xenaki, A., et al., (2013), "Modeling and Detection of Oil in Sea Water", Acoustical Society of America, pp. 2790-2798.

Camilli et al. (2010) "Tracking Hydrocarbon Plume Transport and Biodegradation at Deepwater Horizon", Science, vol. 330, pp. 201-2014.

Crutchley et al. (2009) "Seismic Imaging of Gas Conduits Beneath Seafloor Seep Sites in Shallow Marine Gas Hydrate Province, Hikurangi Margin, New Zealand", Marine Geology Accepted Manuscript, p. 1-53.

Fomel et al. (2007) "Poststack velocity analysis by separation and imaging of seismic diffractions", Geophysics, vol. 72, No. 6, pp. 89-94.

Hohl et al. (2010), "Energy, Environment and Climate Directorate White Paper", DCO Energy, Environment and Climate Workshop, pp. 1-38.

Holbrook et al. (2003), "Thermohaline fine strcture in an oceanographic front from seismic reflection profiling", Science, vol. 301, pp. 821-824.

Magoon et al. (1994) "The Petroleum System—From Source to Trap", AAPG Memoir 60, pp. 3-24.

Makris et al. (2006) "Fish Population and Behavior Revealed by Instantaneous Continental Shelf-Scale Imaging", Science, vol. 311, pp. 660-663.

Ruddick et al. (2009), "Water Column Seismic Images as Maps of Temperature Gradient", Oceanography, vol. 22, No. 1, pp. 192-205.

Sandrea et al. (2007) "Global Oil Reserves—Recovery Factors Leave Vast Target for EOR Technologies", Oil & Gas Journal, pp. 1-8.

Truhlar et al. (1991) "Simple pertubation theory estimates of equilibrium constants from force fields", Journal of Chemical Physics, vol. 94, No. 1, pp. 357-359.

* cited by examiner

EXPLORATION METHOD AND SYSTEM FOR DETECTION OF HYDROCARBONS FROM THE WATER COLUMN

CROSS-REFERENCE TO RELATED APPLICATION

This application claims the benefit of U.S. Provisional Patent Application 62/214,425 filed Sep. 4, 2015 entitled EXPLORATION METHOD AND SYSTEM FOR DETECTION OF HYDROCARBONS FROM THE WATER COLUMN, and is related to U.S. Provisional Patent Application 61/949,802 filed Mar. 7, 2014, U.S. patent application Ser. No. 14/579,481 filed Dec. 22, 2014, and PCT Application No. PCT/US2014/071918 filed Dec. 22, 2014, the entirety of which are incorporated by reference herein.

FIELD OF THE INVENTION

This invention relates generally to the field of hydrocarbon exploration. Specifically, the invention relates to a method and system for detecting hydrocarbons (e.g., oil and/or gas) from the water column, where the method and system include using seismic data to detect bubble plumes that are indicative of hydrocarbon seepages in the water column.

BACKGROUND

Hydrocarbon reserves are becoming increasingly difficult to locate and access, as the demand for energy grows globally. Typically, various technologies are utilized to collect measurement data and then to model the location of potential hydrocarbon accumulations. The modeling may include factors, such as (1) the generation and expulsion of liquid and/or gaseous hydrocarbons from a source rock, (2) migration of hydrocarbons to an accumulation in a reservoir rock, and/or (3) a trap and a seal to prevent significant leakage of hydrocarbons from the reservoir. The collection of these data may be beneficial in modeling potential locations for subsurface hydrocarbon accumulations.

At present, reflection seismic is the dominant technology for the identification of hydrocarbon accumulations. This technique has been successful in identifying structures that may host hydrocarbon accumulations, and may also be utilized to image the hydrocarbon fluids within subsurface accumulations. Typically, the body of water located above a subsurface region is ignored during processing of the seismic data, which focuses on the subsurface region. That is, the seismic processing is directed to identifying subsurface structures that may include hydrocarbons.

To determine the location of hydrocarbons, certain processes involve locating seepages from the seafloor, which are referred to as hydrocarbon seeps. These hydrocarbon seeps may result in bubble plumes in the water column, which may indicate the presence of an active hydrocarbon system. The identification of these bubble plumes is useful in assessing the exploration potential of a prospect. One method for detecting these bubble plumes uses high frequency sources and detectors in a device (e.g., a multi-beam echo sounder). This device can be tuned at close to the bubble resonance frequency and thus be effective at detecting these plumes. The high frequencies typically include 1 kilo Hertz and above. See, e.g., Leifer, I., R. Sassen, P. Stine, R. Mitchell, and N. Guinasso (2002), Transfer of hydrocarbons from natural seeps to the water column and atmosphere, Geofluids, 2(2), 95-107. However, as these techniques involve an additional expense, they are not always performed as part of an exploration site survey.

Lower frequency seismic data can be analyzed for evidence of water-column layering in a field known as "seismic oceanography." See, e.g., Holbrook, W. S., P. Páramo, S. Pearse, and R. W. Schmitt (2003), Thermohaline Fine Structure in an Oceanographic Front from Seismic Reflection Profiling, Science, 301(5634), 821-824, and Ruddick, B., H. Song, C. Dong, and L. Pinheiro (2009), Water Column Seismic Images as Maps of Temperature Gradient, Oceanography, 22(1), 192-205. In this field, horizontal and nearly horizontal signals are produced by thermohaline (temperature/salinity) boundaries in the water column. These signals (along with residual layered source artifacts) constitute noise that can interfere with bubble-plume signals (i.e., the high-angle diffraction anomalies in the water layer). That is, the horizontal and sub-horizontal information may hinder identification of bubble-plume signals.

Given the existing technology, an enhancement to exploration techniques that enhance the ability to detect hydrocarbon seeps is needed. The proposed technique may provide a pre-drill technology that determines the presence and location of hydrocarbon seepages from the seafloor based on measured seismic data. Further, this method may be utilized to locate seafloor hydrocarbon seeps accurately and cost-effectively over the basin-to-play scale as a means to enhance basin assessment and to high-grade areas for exploration.

Additional background references may include John A. Hildebrand et al., "Seismic Imaging of the Water-Column Deep Layer Associated with the Deepwater Horizon Oil Spill", Geophysics, Vol. 77, No. 2, pp. EN11-EN16, March 2012; Reeshidev Bansal et al., "Diffraction Enhancement in Prestack Seismic Data", Geophysics, Vol. 70, No. 3, pp. V73-V79, May 2005; and Igor Kestemberg Marino et al., "Processing of High-Resolution, Shallow Seismic Profiles, Guanabara Bay—Rio de Janeiro State, Brazil", Revista Brasileira de Geoffsica, Vol. 31, No. 4, pp. 579-594, 2013.

SUMMARY

A method for detecting hydrocarbons is described. The method includes obtaining seismic data associated with a body of water in a survey region; analyzing the seismic data to identify at least one noise indicators to produce a noise indicator image; and determining seepage locations by comparing the at least one noise indicator image to the seismic data. In some embodiments, the method further comprises applying a filter to at least a portion of the seismic data to enhance diffraction anomaly signals with respect to horizontal or nearly horizontal signals associated with the water-column to form filtered seismic data; and determining seepage locations based on comparing the noise indicator images to the filtered seismic data.

In another embodiment, a computer system for detecting hydrocarbons is described. The computer system includes a processor; memory coupled to the processor; and a set of instructions, stored in the memory. The set of instructions, when executed by the processor, are configured to: obtain seismic data associated with a body of water in a survey region; analyzing the seismic data to identify at least one noise indicators to produce a noise indicator image; and determining seepage locations by comparing the at least one noise indicator image to the seismic data. In some embodiments, the set of instructions are further configured to applying a filter to at least a portion of the seismic data to enhance diffraction anomaly signals with respect to horizontal or nearly horizontal signals associated with the water-column to form filtered seismic data; and determine seepage locations based on comparing the at least one noise indicator image to the filtered seismic data.

DETAILED DESCRIPTION

Figure 1:
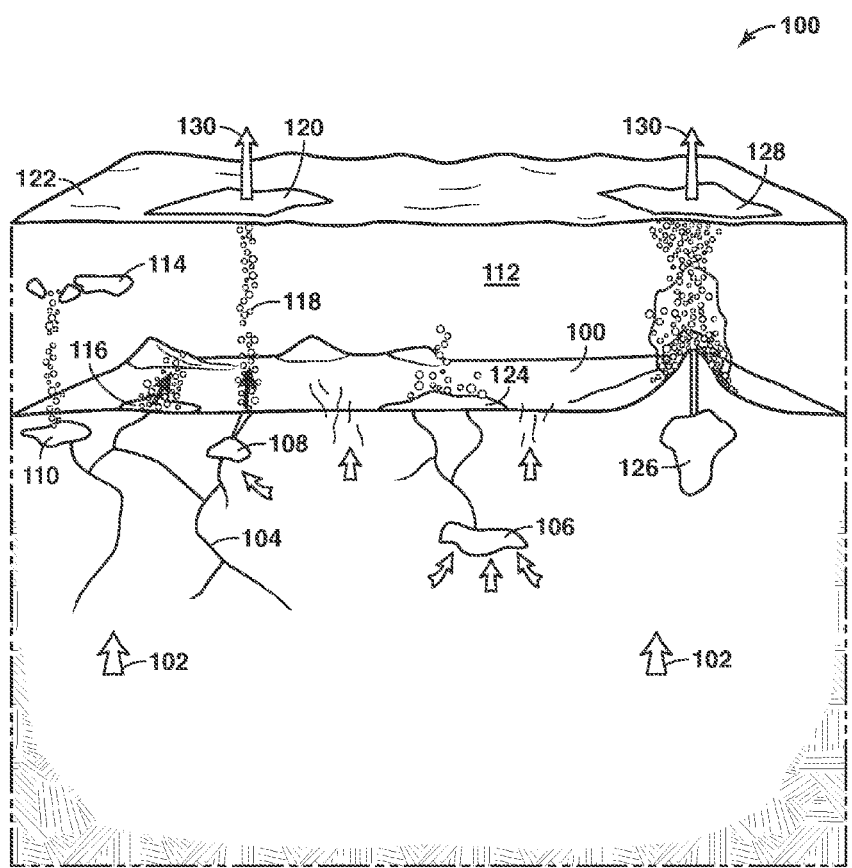
FIG. 1 is a side elevational view of a seafloor.

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

A seep is a natural surface leak of gas and/or oil. The hydrocarbon (e.g., petroleum) reaches the surface of the Earth's crust along fractures, faults, unconformities, or bedding planes, or is exposed by surface erosion into porous rock. The presence of an oil or gas seep at the seafloor or sea surface indicates that three basic geological conditions critical to petroleum exploration have been fulfilled. First, organic-rich rocks have been deposited and preserved (i.e., source presence). Second, the source has been heated and matured (i.e., source maturity). Third, secondary migration has taken place (i.e., hydrocarbon migration from the source location). While a surface seep of thermogenic hydrocarbons does not ensure that material subsurface oil and gas accumulations exist, seeps provide a mechanism to de-risk elements of an exploration play. That is, the presence of a seep may be utilized to remove uncertainty from modeling and interpreting the subsurface.

In the present disclosure, an enhancement to exploration techniques that filters data (e.g., the seismic data) and identifies sources of noise anomalies in at least a portion of the water column is described. As hydrocarbon occurrence data is typically not easily obtained for a regional scale and not appropriately evaluated in the context of integrated hydrocarbon systems, the ability to identify and characterize seeps and hydrocarbons in the water column provides significant enhancements for evaluating and capturing opportunities. Further, the use of existing seismic data provides cost effective enhancements for evaluating and capturing opportunities. As a result, the present techniques provide a method to locate seepages on the seafloor in a more accurate and cost-effective manner, which enhances basin assessment.

A seep often creates a localized variation or anomaly in the water-column physical properties, such as acoustic velocity and/or density. The seismic acquisition method identifies physical property anomalies as a diffraction pattern in the recorded or processed data. This pattern is defined as a "diffraction anomaly" or "diffraction anomaly signal." In the present techniques, seismic data from the water-column is analyzed to identify noise indicators to assist in the identification of diffraction anomalies as seepage locations. In some embodiments, the seismic data is first processed with a screening filter to produce filtered seismic data, and then identifying noise indicators within the filtered seismic data to assist in the identification of diffraction anomalies in the filtered seismic data as the seepage locations. The analysis and filtering may be used with the measured seismic data and/or with stacked seismic data. In some embodiments, the methods may further include removing or masking portions of the seismic data prior to identifying noise indicators and/or applying the filter on the seismic data. For example, the subsurface portion of the seismic data, such as the portion below the sea floor or the portion of the seismic data below a certain depth below the sea floor, may be masked, or a portion of the seismic data above a certain depth in the water column may be masked. Thus, the techniques may be particularly useful in assessing deep water locations, such as those where the water column depth is greater than 1000 m, or greater than 1500 m, or greater than 2000 m, or greater than 2500 m, or greater than 3000 m As described herein, seismic data can be analyzed for evidence of water-column layering disruptions (e.g., diffraction anomalies) that may be indicative of bubble plumes. The seismic data often contains residual noise and other amplitude anomalies that can masquerade as bubble-plume signals. Screening filters can be applied to remove some of the noise from water-column layering while retaining the dips characteristic of bubble-plume diffractions. However, residual noises can still be left behind that can interfere with the identification of the bubble-plume signal. Thus, it would be desirable to identify noise-prone areas within the data. For example, a noise indicator can be used to aid in the interpretation of the data by allowing the data interpreter to correlate features in the data with the initial prevalence or absence of noise. Diagnostic displays of noise-prone areas can incorporate information (e.g., from prestack data) that would not be visible in the stacked data display, thus allowing the data interpreter to more easily distinguish between bubble-plume signals and residual noise.

Beneficially, the use of the methods described herein can provide a pre-drill technology that may determine the presence and location of hydrocarbon seepages from the seafloor. Further, this method may be utilized to locate seafloor hydrocarbon seeps accurately and cost-effectively over the basin-to-play scale as a means to enhance basin assessment and to high-grade areas for exploration. For example, as the seismic data may be collected for the subsurface (e.g., below the seafloor) locations regardless, the analysis of filtered seismic data may involve processing previously collected or concurrently collected seismic surveys. As a result, the processing of seismic data for at least a portion of the water column portion of the seismic data may lessen uncertainty, with minimal additional cost. Accordingly, the methods described herein provide geoscientists with an enhanced identification technique for hydrocarbon accumulations and increases the confidence in the identified hydrocarbon accumulations. Various aspects of the present techniques are described further with reference to the appended Figures.

FIG. 1 is a diagram illustrating the numerous subsurface sources and migration pathways of hydrocarbons present at or escaping from seeps on the ocean floor 100. Hydrocarbons 102 generated at source rock (not shown) migrate upward through faults and fractures 104. The migrating hydrocarbons may be trapped in reservoir rock and form a hydrocarbon accumulation, such as a gas 106, oil and gas 108, or a gas hydrate accumulation 110. Hydrocarbons seeping from the gas hydrate accumulation may dissolve into methane and higher hydrocarbons (e.g., ethane, propane) in the ocean 112 as shown at 114, or may remain as a gas hydrate on the ocean floor 100 as shown at 116. Alternatively, oil or gas from oil/gas reservoir 108 may seep into the ocean, as shown at 118, and form an oil slick 120 on the ocean surface 122. A bacterial mat 124 may form at a gas seep location, leaking from gas reservoir 106, and may generate biogenic hydrocarbon gases while degrading thermogenic wet gas. Still another process of hydrocarbon seepage is via a mud volcano 126, which can form an oil slick 128 on the ocean surface. Oil slicks 120 and 128 or methane and higher hydrocarbon (e.g., ethane, propane, etc.) gases 130 emitted therefrom are signs of hydrocarbon seepage that are, in turn, signs of possible subsurface hydrocarbon accumulation. The signatures measured from each of these seeps may be analyzed to discriminate between the different origins of hydrocarbons encountered at these seeps. For example, methodologies and techniques, such as those disclosed in PCT Publication No. WO 2013/071185, may discriminate between hydrocarbons that have migrated directly to the surface without encountering a trap within which they can be accumulated (e.g., a first source) and hydrocarbons that have leaked from a subsurface accumulation (e.g., a second source). If the presence and volume of such a hydrocarbon accumulation can be identified, it is possible the hydrocarbons from such an accumulation can be extracted.

Figure 2:
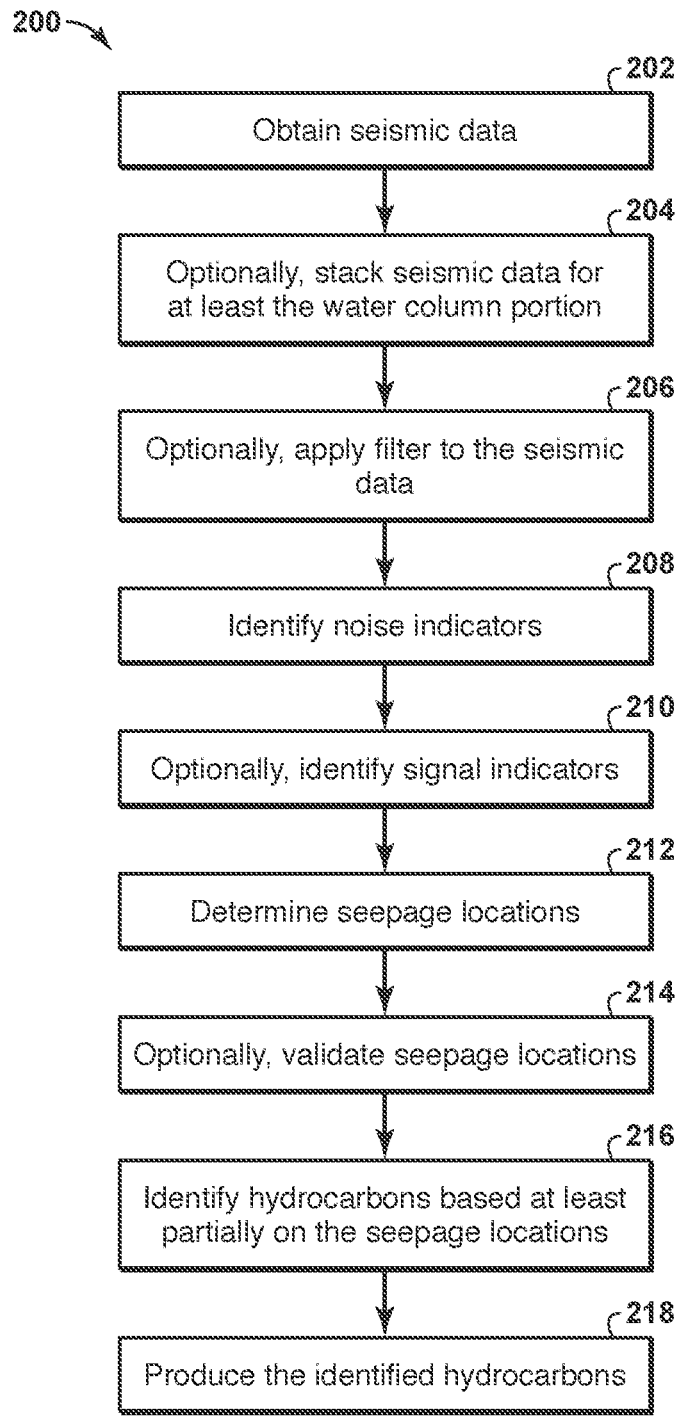
FIG. 2 is a flow chart for performing hydrocarbon exploration in accordance with an exemplary embodiment of the present techniques.

FIG. 2 is a flow chart 200 for performing hydrocarbon exploration in accordance with an exemplary embodiment of the present techniques. In the flow chart 200, the seismic data for a survey region is obtained, as shown in block 202, seismic data is processed to identify seepage locations, as shown in blocks 204 to 212, the seepage locations are validated, as shown in block 214, and hydrocarbons are identified and produced, as shown in blocks 216 and 218.

To begin, seismic data is obtained, as shown in block 202. The obtaining of the seismic data may include determining a survey region, acquiring measured seismic data, and optionally performing some initial processing on the measured seismic data. Alternatively, the seismic data may be obtained from a previously performed survey. For example, the seismic data may be low frequency seismic data such as from a seismic oceanography survey.

Once the seismic data is obtained, the processing of the seismic data may be performed to determine seepage locations, as shown in blocks 204 to 212. In block 204, the seismic data may optionally be stacked to form stacked seismic data. The stacking of the seismic data may include combining seismic traces together to lessen interference from noise in the individual seismic traces and enhance the quality of the data. The stacking may include full stacks, partial stacks, slant stacks, and other stacking techniques. As an example, CMP stacking techniques may be utilized to form CMP gathers from the seismic traces.

Then, at block 206, a filter may be optionally applied to the seismic data, which may be the measured seismic data or stacked seismic data. The filter can enhance the detection of bubble plume anomalies (e.g., by reducing the horizontal or nearly horizontal, and optionally random components, with respect to higher angle diffractions anomalies). For example, a filter may be used to remove non-diffraction energy by a complex tracking of strong and continuous signals. Alternatively, a filter may be used that removes horizontal signals and noises based on dip as further described with reference to FIG. 3.

In block 208 noise indicators are identified in the seismic data which may have been filtered in block 206. Identifying noise indicators may also include creating a noise image to show where the targeted noise is present. The noise indicators may be used to identify a variety of different noise types, which may include, for example, reverberation noise, direct arrival noise, or residual layering noise. After the noise indicators are identified, the data may be further filtered to indicator noise-prone locations by (a) rectifying the noise data, (b) smoothing the noise data in time and space, and/or (c) segmenting and/or color mapping the data to indicate the likelihood of noise presence. The identification of the noise indicators are further described with reference to FIGS. 7 to 10.

In block 210 signal indicators may be optionally identified. This may include generating signal indicator images to enhance signal-prone areas. For example, the signal velocity can be used as a signal indicator to help classify a signal from a bubble plume versus noise. That is, bubble diffractions often stack well at velocities that are higher than the actual water velocity due to asymmetric ray paths related to point diffractors. That is, the stacking velocity generally increases as the diffraction point offset varies away from the midpoint between the source and the receiver. Thus, the signal velocity can be used as a signal indicator that can aid in differentiating between diffractions from bubble plumes and those from layering reflections.

Another example of signal properties that may be used as signal indicators is the geometric properties of the data. For example, typically diffraction signals from a bubble plume are narrow and nearly vertical, which may be compared against wider and more horizontal signals due to reverberation noise.

Another example of a signal indicator that may be used is the source-receiver offset for stacked and unstacked seismic data. That is, utilizing shorter source-receiver offsets can produce a collection of narrower plumes, as compared to using wider/fuller source-receiver offsets which can blur the plumes together due to the higher ray path angles. Therefore, sorting the seismic traces by the source-receiver offset can aid in differentiating between diffraction signals from bubble plumes and those from reverberations and other noise.

The noise indicators identified in block 208 and the signal indicators identified in block 210 can then be used to enhance the water column data interpretation by assisting in noise reduction or by indicating signal- or noise-prone areas. This improved interpretation can then be used to determine seepage locations, as shown in block 212.

The identification of seepage locations may include visually inspecting the images of the seismic data to indicate seepage locations or using instructions executed on a computer to highlight potential seepage locations. As an example, potential anomalies are first identified by having amplitude that is larger than the surrounding values. The amplitudes may be examined from the filtered data or from an envelope recovered from the filtered data. For true amplitude data, anomalies can also be identified by the actual signal diffraction amplitude. Bubble plume anomalies of interest would likely have absolute amplitudes that are about 0.0001 or larger.

At block 214, the seepage locations may be validated. The validation of seepage locations may include various techniques. For example, the seepage locations may be validated by using high amplitude diffraction anomalies that appear in the filtered seismic data. The validation steps may include identification of locally high amplitude zones that are nearly vertical; identifying and removing source-noise anomalies, such as typically appear in the earlier times (less than about one second); identifying structural features (e.g., water-bottom bathymetric features) that could be related to a candidate plume; and/or validating suspected high amplitude diffraction anomalies by comparison with pre-stack data to differentiate hyperbolic signals from likely noise effects. Other examples of different data that may be utilized to validate the seepage locations are described in International Patent Application Publication No. 2013/071185, which is hereby incorporated by reference in its entirety. The validation step may include one or more of these techniques either individually or combined together to further lessen uncertainty with regard to the seepage locations.

As an example, the validating step may include identifying one or more clusters of diffraction anomalies and comparing the one or more clusters with a seepage plume pattern to determine the seepage locations. As another example, the validating step may include identifying one or more clusters of diffraction anomalies; identifying one or more subsurface structural features in the survey region (such as bathymetric, shallow seismic features and/or faults); comparing the one or more clusters with subsurface structural features to determine the seepage locations (e.g. visual inspection or spatial relationship calculation). Further still, the potential bubble plume locations can be validated by comparison of the identified high amplitude diffraction anomalies with the corresponding prestack data at the same locations. Diffractions may appear in the prestack data as hyperbolic events in the prestack gathers. Alternatively, false diffractions (anomalies) due to noise may appear in the prestack gathers as selected high-noise traces or other patterns that do not fit the expected hyperbolic curvature at water velocity. As yet another example, the validating step may include performing one or more of ocean magnetic and gravity surveys; optical sensing survey and thermal anomalies detection survey to obtain measurement data; and comparing the measurement data with the filter seismic data to determine the seepage locations. In yet another example, the validating step may include obtaining biological and chemical samples of one or more of fluids, gases, and sediments in the survey region; identifying one or more clusters of diffraction anomalies from the filtered seismic data; and comparing the one or more clusters of diffraction anomalies with the obtained biological and chemical samples to determine the seepage locations. As may be appreciated, one or more of these validation steps may be combined together to further lessen uncertainty with regard to the seepage locations.

Once the seepage locations are determined, the hydrocarbons are identified and produced, as shown in blocks 216 and 218. In block 216, hydrocarbons are identified based at least partially on the identified seepage locations. As an example, the identified seepage locations may be integrated with other measured data or subsurface models of the subsurface regions below the survey region (e.g., locations below the sea floor). The validated anomalies can then be further evaluated by geochemical analysis from, for example, a sample collection step such as a drop-core survey. The drop-core survey (or other geochemical survey) may target bathymetric or other anomalies (e.g., pock marks or faults) that are identified during the validation step as possible source points for the plume anomaly. These different types of data may be integrated based on location information associated with the respective data to lessen uncertainty associated with the existence of hydrocarbons.

Finally, the identified hydrocarbons may be produced, as shown in block 218. With the identification of hydrocarbons, drilling of a well may be performed to provide access to the hydrocarbon accumulation. Further, the production may include installing a production facility configured to monitor and produce hydrocarbons from the production intervals that provide access to the hydrocarbons in the subsurface formation. The production facility may include one or more units to process and manage the flow of production fluids, such as hydrocarbons and/or water, from the formation. To access the production intervals, the production facility may be coupled to a tree and various control valves via a control umbilical, production tubing for passing fluids from the tree to the production facility, control tubing for hydraulic or electrical devices, and a control cable for communicating with other devices within the wellbore.

Beneficially, the methods described herein provide an enhancement in the exploration of hydrocarbons. In particular, the method may be utilized prior to drilling operations to reduce exploration risk by providing more information about the presence and location of thermogenic hydrocarbon seepages from the seafloor. Further, by using seismic data, the method may be more cost effective than other remote sensing techniques. As a result, this method enhances basin assessment and techniques to high-grade areas for exploration. Further, the integration of the seismic data with gravity, magnetics, and acoustic data from other surface surveys, subsurface model or other information may provide additional insights to enhance the exploration activities.

The present techniques may also include other processing steps to lessen uncertainty. For example, the method may include creating a satellite imagery of the survey region, which may include chemical information, biological information, and other measurement information, as well.

Figure 3:
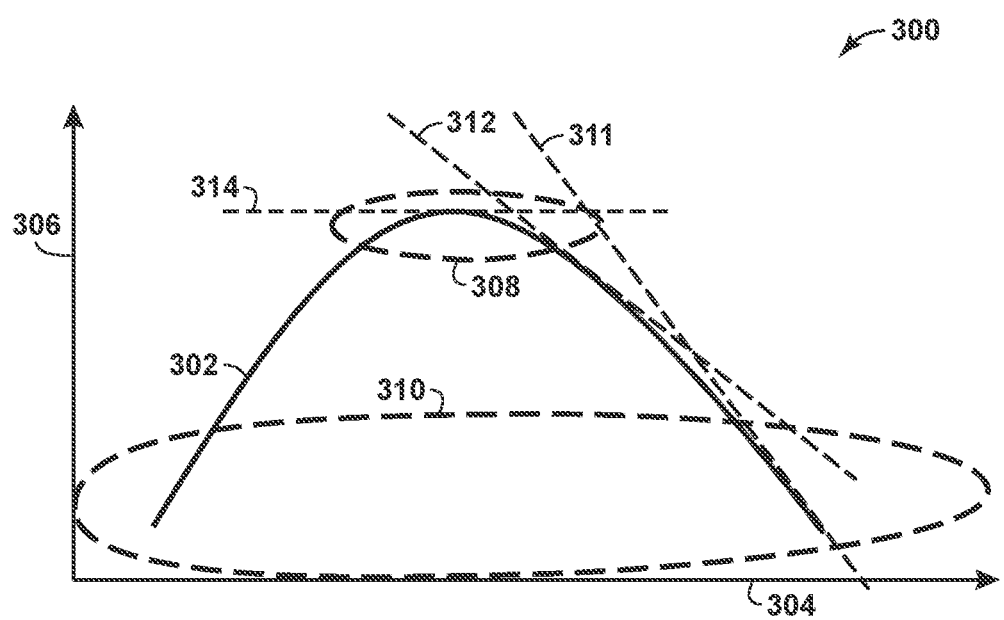
FIG. 3 is an exemplary response for a vertically moving bubble.

FIG. 3 illustrates the use of a screening filter. The screening filter can enhance the reliability of the seepage location determination by lessening uncertainty associated with the identified seepage locations. That is, the term "enhance" means that the seepage-related diffraction anomaly is made more obvious by the screening filter. For example, by using the screening filter the non-diffraction signals in the data can appear decreased in energy relative to the seepage-related diffraction signals. The screening filter can remove flat-lying energy from the seismic data (e.g., portion of the seismic data associated with the water column being reviewed), while retaining dip characteristic of expected plumes from seepage locations. The filtering is beneficial because it removes portions of the dip spectrum that are dominated by residual source noise and water-column layering. The filtering is also beneficial at removing portions of the random noise in the water column. This is because random noise is constituted as a sum of many dips and a range of these dips are removed by the filter. The result is a reduced residual noise level. The random noise in the water-column data is that part of the measured data that comes from something other than the current applied seismic source. This can include ambient (e.g., environmental) noises or unwanted parts of the acquisition system such as streamer (e.g., receiver) towing noise or leftover effects from previous source applications.

Screening filters may take various forms, such as image destriping using wavelet and fourier analysis, or eigenimage suppression of flat energy. However, as an example, a weighted trace mix may be the preferred means for implementing the screening filter because full FK (frequency-wave number) filters tend to spread artifacts from the much-stronger water bottom into the weaker overlying water column. The trace weights preferably sum to zero to ensure removal of flat energy. A set of weights may include the set of 0.25*{−0.25, −0.5, −0.25, 0.0, 0.5, 1.0, 0.5, 0.0, −0.25, −0.5, −0.25} for an 11-trace weighted mix. The number of traces between the negative and positive peaks (e.g., four traces for −0.5 to 1.0 in this example) is set so that a dip of interest at the dominant frequency passes unattenuated.

As an example, the gap between the positive and negative peak values in the weights can be determined in various methods. Specifically, the method may include:

(i) determining a desired dip to keep without attenuation. In this and all subsequent references to dip, it is understood that the dip may be positive or negative (i.e., time increasing or decreasing as the distance increases). This equivalency follows from the symmetry of the diffraction pattern as illustrated in FIG. 3. For simplicity, positive dips are mentioned in the text, but these should be understood to mean positive or negative dips of the same absolute value. Begin with the maximum dip that comes from a horizontally traveling arrival:

Dip_max=(2/Vw)*1000 that equals approximately 1.3 ms/m (milliseconds per meter) where Vw is the water velocity in m/s (meters per second). This maximum dip is often not present in the water column data because of acquisition parameters (e.g., receiver arrays) that aim at reducing horizontally traveling arrivals. As a result, the dip that is targeted to pass unattenuated (i.e., "Dip_pass") is some fraction of this value (say 20%) or 0.26 ms/m. A smaller fraction of this maximum dip, such as from 10% to 0.1% or 0.13 ms/m to 0.01 ms/m in this example, may be defined as "nearly horizontal." The range from horizontal (0 ms/m) to nearly horizontal (0.13 ms/m) may be targeted for removal or attenuation by the filter. This aspect may be referred to as removing the horizontal and nearly horizontal signals.

(ii) the dominant frequency in the water column data is determined using any standard estimation technique (including simply counting cycles). From this the half-period is determined as T_half=1/(2*freq) that equals approximately 12.5 ms, for example, when the dominant frequency "freq" equals 40 Hz (Hertz).

(iii) the distance is determined for the desired dip to move by the half-period time:

Dist=T_half/Dip_pass that equals (12.5 ms/0.26 ms/m) or approximately 48 m (meters) in this example.

(iv) the number of traces is determined that comes close to this required distance based on the known trace spacing. In the current example, a trace spacing of 12 m (meters) would require four (4) trace spacing between the positive and negative peaks in the weighting function as initially given in the sample set of weights given above. Using this spacing provides a signal at the dominant frequency and desired dip to pass unattenuated by the filter. The success of the specified dip filter is not particularly sensitive to this design methodology. The removal of a large portion of the horizontal dip component is beneficial, while keeping a large portion of the diffraction dips that are present in the data.

In various aspects the filtering may be adjusted to remove certain portions of the seismic data, such as flat segments and high angle segments. Accordingly, as may be appreciated, the filtering may be designed to capture certain portions of the data. For example, the filter may be configured to maintain between about 50% and about 5% of the maximum dip of the diffraction, between about 40% and about 8% of the maximum dip of the diffraction or between about 30% and about 12% of the maximum dip of the diffraction. The remaining portion may be discarded or muted.

In other aspects, the filtering may include masking a portion of the seismic data in the body of water between the surface and a specific depth below the surface. As an example, the filtering may mask at least of the portion of seismic data from the surface of the body of water to 500 meters below the surface of the body of water, from the surface of the body of water to 700 meters below the surface of the body of water, and/or from the surface of the body of water to 900 meters below the surface of the body of water.

With reference to FIG. 3, an exemplary graph 300 of a response 302 for a vertically moving bubble is shown. In this graph 300, a response 302 is shown relative to a distance along stacked section 304 verses time 306. This is a seismic diffraction anomaly response for a spatially localized acoustic velocity or density variation. A bubble plume can be thought of as a set of such localized variations that would appear in the data as a collection of diffraction anomaly responses.

As may be appreciated, various sections of the response 302 may be filtered to reduce the noise in the seismic data associated with the water column. For example, region 308 represents the flat segments of the response 302. The flat segments are the flat dips that occur at the same dips as much of the source noise and unwanted water column layering. The filter applied to the seismic data may remove the seismic data in region 308 of the response 302. By removing this portion of the dip spectrum, a portion of the diffraction anomaly signal is removed to lessen a larger portion of the interfering noises and unwanted water column layering. Region 310 represents the high angle information, which is typically lost due to the receiver array configuration (e.g., water velocity related maximum dip). While these data may be useful, it may also be filtered in certain embodiments. The regions of the response between these two regions 308 and 310 are the shoulder dips that have preferred signal to noise ratios for the seismic data in the water column.

The dashed responses 311, 312, and 314 provide tangent lines for the response 302. The response 311 is at a point on the response 302 that is proportionally related to the water velocity (e.g., about 1.3 ms/m). The response 312 is at a point on the response 302 that is proportionally related to the desired data range of about 0.26 ms/m. The response 314 is at a point on the response 302 that is proportionally related to the horizontal maximum (e.g., at 0 ms/m). As may be appreciated, the filtering may be designed to capture certain portions of the response 302. For example, the filter may be configured to maintain between about 50% and about 5% of the maximum dip of the diffraction, between about 40% and about 8% of the maximum dip of the diffraction, or between about 30% and about 12% of the maximum dip of the diffraction. The remaining portion may be discarded or muted.

As an example, the screening filter may include input from a stacked 2D line that has been processed to retain the water-column data. The processing of the seismic data to retain the water-column data may include velocity picking in the water column, a muting to remove sub-water bottom data, source-noise muting and/or other filtering to reduce residual source noises. Stacked 3D data may be handled in a similar manner to a set of stacked 2D lines in the screening step.

Figure 4A:
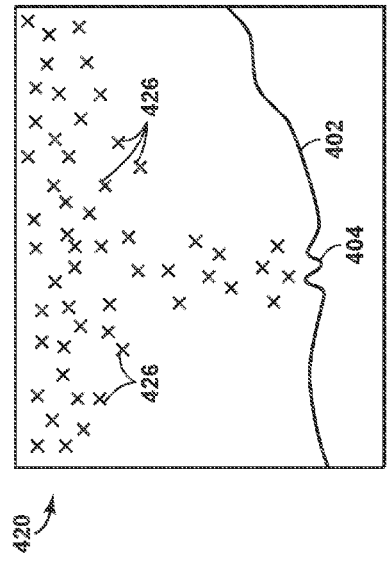
FIGS. 4A, 4B, and 4C represent exemplary stacked water-column data diagrams.
Figure 4B:
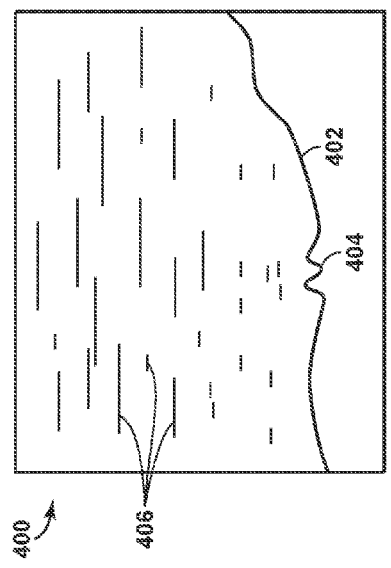
Figure 4C:
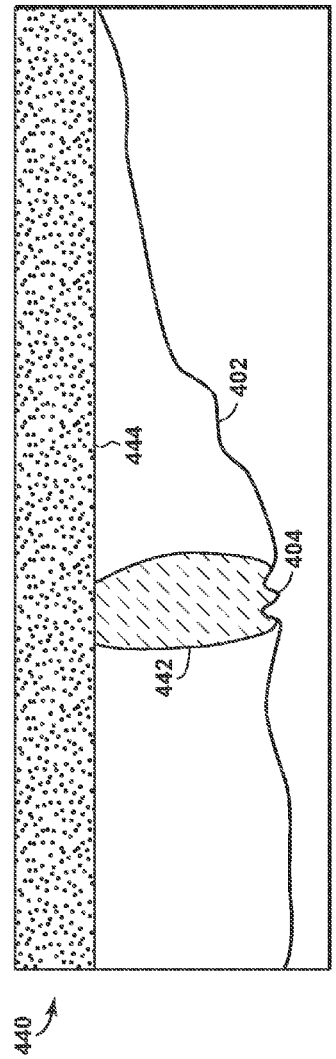

FIGS. 4A, 4B, and 4C represent stacked water-column data diagrams. In FIG. 4A, a diagram 400 represents stacked seismic data in the water column, which includes numerous flat segments from residual source noise or water layering. This diagram 400 represents the stacked seismic data before the screening filter is applied. In this diagram 400, the area above the seafloor 402 is the water column. The seafloor 402 has a structural feature 404 (e.g., water-bottom bathymetric feature), which is a seep in this diagram 400. Also, numerous artifacts 406 (e.g., the flat segments) are represented in the water column making it difficult to detect any bubble-plume anomalies in this seismic data.

In FIG. 4B, a diagram 420 represents stacked seismic data in the water column after application of the screening filter. In this diagram 420, the area above the seafloor 402 is the water column and the structural feature 404 is a seep. The numerous artifacts 426 are represented in the water column. As shown in this diagram 420, the flat-lying energy has been largely removed leaving potential bubble-plume anomalies as indicated by the signals 426. Thus, the filtering of the seismic data provides a clearer indication of the location of a hydrocarbon seep.

In FIG. 4C, a diagram 440 represents the full 2D seismic water-column data and shows the high amplitude diffraction anomaly 442 as a narrow vertical feature that is a potential bubble plume. The water-bottom feature 404 below this anomaly provides validation that the anomaly may be a plume associated with a hydrocarbon seep. The high amplitude shallow portion 444 represents residual artifacts from source noise or unwanted thermohaline layering, which is found in shallower depths. Accordingly, for this diagram 440, the masking may be applied to remove the water column seismic data that is shallower than a certain depth. For example, the water depths shallower than 1000 meters (m), shallower than 900 m, shallower than 800 m, shallower than 700 m, shallower than 600 m, and/or shallower than 500 m, may be filtered or masked to simplify interpretation. That is, the filtering may include masking a portion of the seismic data in the body of water between the surface and a specific depth below the surface. As an example, the filtering may mask at least of the portion of seismic data from the surface of the body of water to 500 m below the surface of the body of water, or from the surface of the body of water to 600 m, or 700 m, or 800 m, or 900 m, or 1000 m, below the surface of the body of water.

Figure 5:
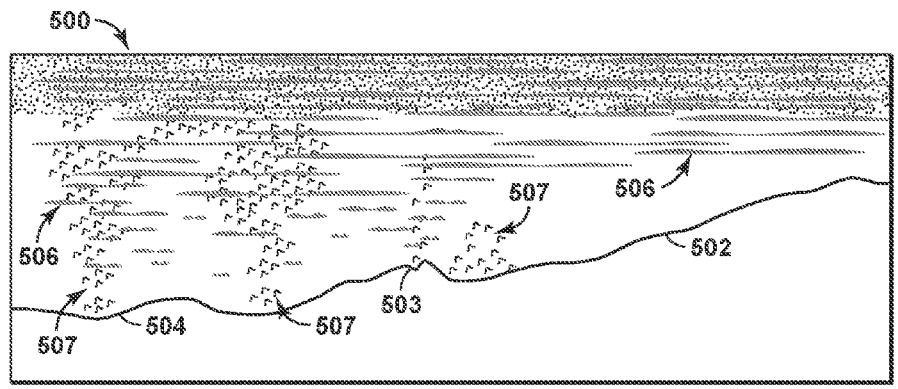
FIG. 5 is an exemplary stacked water-column data diagram.

FIG. 5 represents another illustration of a stacked water-column data. In FIG. 5, a diagram 500 represents stacked seismic data in the water column, which includes numerous flat segments from residual source noise or water layering as well as various amplitude anomalies. This diagram 500 represents the stacked seismic data before any screening filters are applied. In diagram 500, the area above the seafloor 502 is the water column. The sea floor 502 has structural features 503 and 504 (e.g., water-bottom bathymetric feature 504). Numerous artifacts 506 (e.g., the flat segments) and amplitude anomalies 507 are seen in diagram 500. The artifacts and the amplitude anomalies make it difficult to discern which anomalies result from any bubble-plumes that may be present and which are noise anomalies that result from, for example, reverberations.

Figure 6:
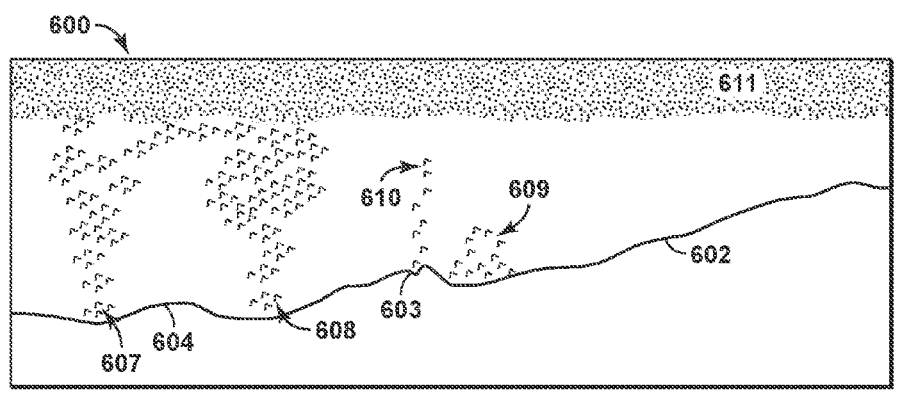
FIG. 6 is the exemplary stacked water-column data diagram of FIG. 5 after a screening filter has been applied.

In FIG. 6, diagram 600 represents the stacked seismic data in the water column of FIG. 5 after application of the screening filter. The sea floor 602 has structural features 603 and 604. While the screening filer used in FIGS. 4A, 4B, and 4C left only one identifiable bubble plume anomaly, as seen in FIG. 6, even after applying the screening filter there are often numerous amplitude anomalies (e.g., 607, 608, 609, and 610) that remain and other noise 611 which can make it difficult to determine which, if any, are bubble-plume anomalies and which are noise anomalies. Thus, it would be useful to identify noise indicators and/or signal indicators to aid in the determination of which, if any, of the remaining anomalies are due to bubble-plumes and, thus, hydrocarbon seepages.

Figure 7A:
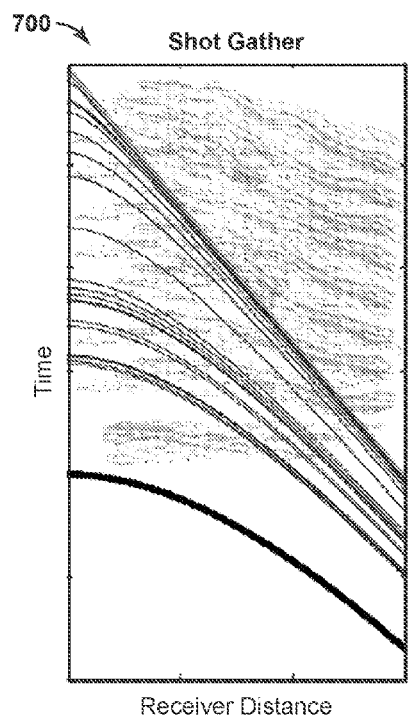
FIGS. 7A and 7B illustrate shot gathers that layer signal and reverberation noise.
Figure 7B:
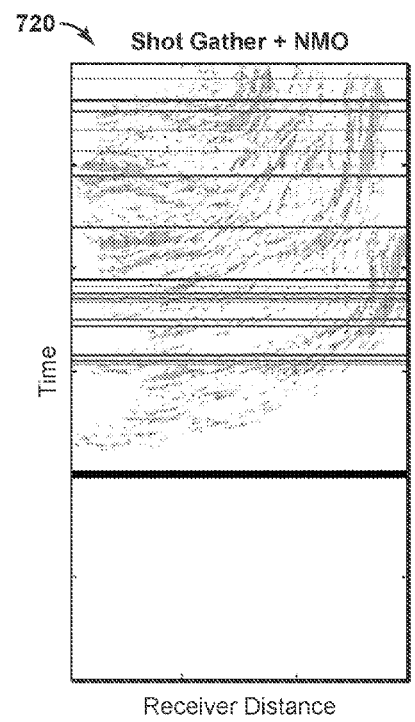

FIGS. 7A and 7B illustrate shot gathers that layer signal and reverberation noise at anomalously high velocity. The diagrams 700 and 720 show a selection of shot-ordered gathers after some filtering to remove low-frequency source noise and recording DC bias. The patches of high-amplitude (high velocity) noise vary between the gathers and are caused by reverberation noise in the water column. The reverberation noise is the leftover up-and-down bounces from previous shots, and has a diagnostic high-velocity appearance since the wavefront has spread out in the time between shots. The noise in the shot gathers can be emphasized by reducing the non-reverberation portions of the shot gather followed by smoothing of the stacked reverberation noise to generate a noise indicator image as seen in FIG. 8.

Figure 8:
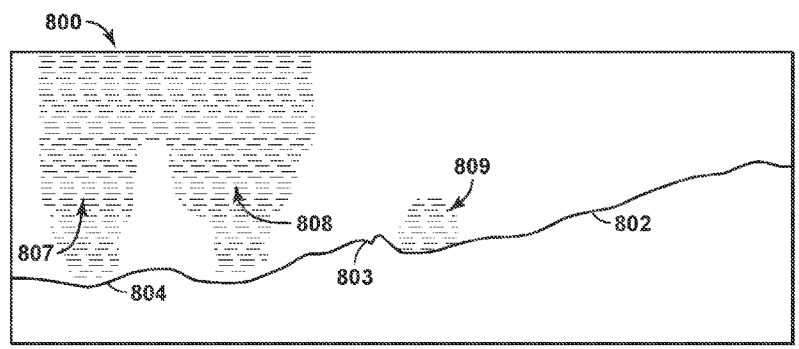
FIG. 8 is an exemplary noise indicator image indicating reverberation noise.

In FIG. 8, diagram 800 represents a reverberation noise indicator section obtained from the stacked water column data of FIG. 5. Like in FIG. 5, the sea floor 802 in FIG. 8 has structural features 803 and 804. To produce FIG. 8 the water velocity signal was removed from the data of FIG. 5, and then the data was rectified by a low-pass time filter and spatial trace mix. As seen in FIG. 8, high amplitude areas 807, 808, and 809 are present, and are most likely due to the concave topography of the sea floor 802 which focus the reverberations. By comparing the noise indicators in FIG. 8 with the filtered stacked water column data of FIG. 6, it can be seen that the high amplitude areas 807, 808, and 809 correspond to diffraction anomalies 607, 608, and 609. Thus, by using the noise indicator images in FIG. 8, one can identify in FIG. 6 that the diffraction anomalies 607, 608, and 609 are due to reverberation noise, whereas diffraction anomaly 610 is not. As such, diffraction anomaly 610 could be identified as a potential bubble-plume diffraction anomaly. Thus, by using the shot gathers and producing noise indicator images, one can improve the data interpretation to better differentiate between signals due to bubble-plumes and those due to noise.

Figure 9:
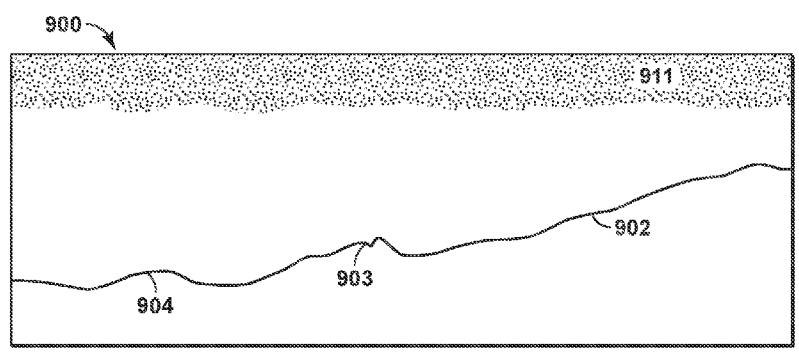
FIG. 9 is an exemplary noise indicator image indicating direct-arrival noise

The diagram 900 in FIG. 9 illustrates a direct-arrival noise indicator image obtained from the stacked water column data of FIG. 5. Like in FIG. 5, the sea floor 902 in FIG. 9 has structural features 903 and 904. To produce FIG. 9, the linear arrival data was stacked, the hyperbolic reflection data was removed, and the resulting data was rectified by a low-pass time filter and spatial trace mix. The resulting image illustrates areas with strong direct-arrival noise 911. By comparing the noise indicator image 900 with the filtered data image 600 in FIG. 6, one can identify the noise 611 as being due to direct-arrival noise.

Figure 10:
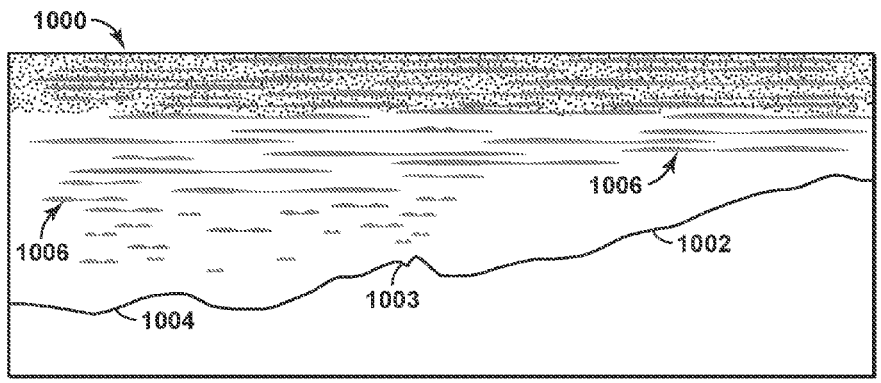
FIG. 10 is an exemplary noise indicator image indicating layering noise.

The diagram 1000 in FIG. 10 illustrates a water-column layering noise indicator image obtained from the stacked water column data of FIG. 5. While, water-column layering noise may be a signal of interest in seismic oceanography, the water-column layering noise can mask signals from bubble-plumes. Therefore, it would be beneficial to identify this noise indicator to more easily identify signals from bubble plumes. Like in FIG. 5, in FIG. 10 the sea floor 1002 has structural features 1004 and 1003. To produce FIG. 10, the reflection arrivals at water velocity were stacked and the resulting data was rectified using a low-pass time filter and spatial trail mix. The resulting noise indicator image illustrates areas 1006 that are indicative of water-column layering. Comparing the noise indicator image with the stacked water column data of FIG. 5, one can determine that the diffraction anomalies 506 in FIG. 5 are due to water-column layering noise.

Figure 11:
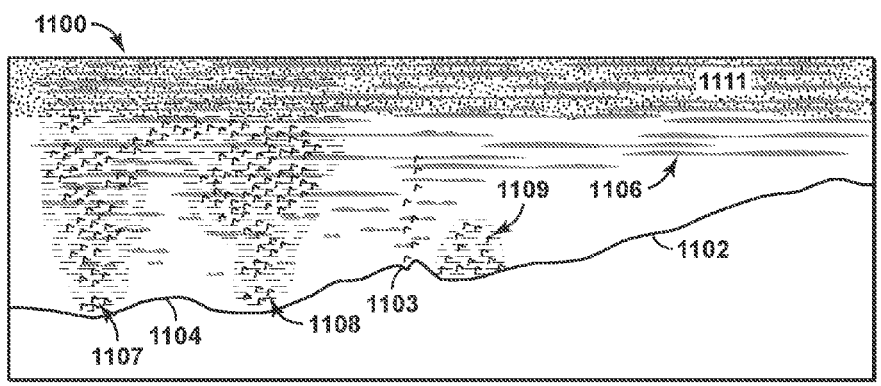
FIG. 11 is an exemplary noise indicator image overlay that can be used to indicate noise prone areas.

The diagram 1100 in FIG. 11 illustrates an overlay of the noise indicator images of FIGS. 8, 9, and 10, with the stacked water column data of FIG. 5. By overlaying the noise indicator images one can identify noise-prone areas and more easily identify diffraction anomalies due to bubble plumes. In some embodiments, the different noise indicator images can be different colored to more readily distinguish signals from bubble plumes from those of noise prone areas. In FIG. 11, the sea floor 1102 has structural features 1104 and 1103. As seen in FIG. 11, the reverberation noise signals 1107, 1108, and 1109, the water-column layering noise signals 1106, and the direct-arrival noise signals 1111 can all be overlaid to easily identify diffraction anomaly 1103 as a signal of interest that could be from a bubble-plume. In some embodiments, the noise signals can be colored to aid in the interpretation of the data. For example, the reverberation noise indicator image could be colored blue, the water column layering noise indicator image could be colored pink, and the direct arrival noise indicator image could be colored yellow. The combined display thus aids one in interpreting the data of FIG. 5, for example, by readily indicating that the plumes 1107, 1108, and 1109 are from reverberation noise.

Also as seen in FIG. 11, the bubble-plume signal 1103 can be identified by comparing the geometric property of the signal as compared to the signals 1107, 1108, and 1109. That is, signal 1103 has a narrow and nearly vertical amplitude expression indicating that it may be from a bubble-plume. In comparison, signals 1107, 1108, and 1109 are wider and more diffuse indicating they are likely noise signals.

Figure 12:
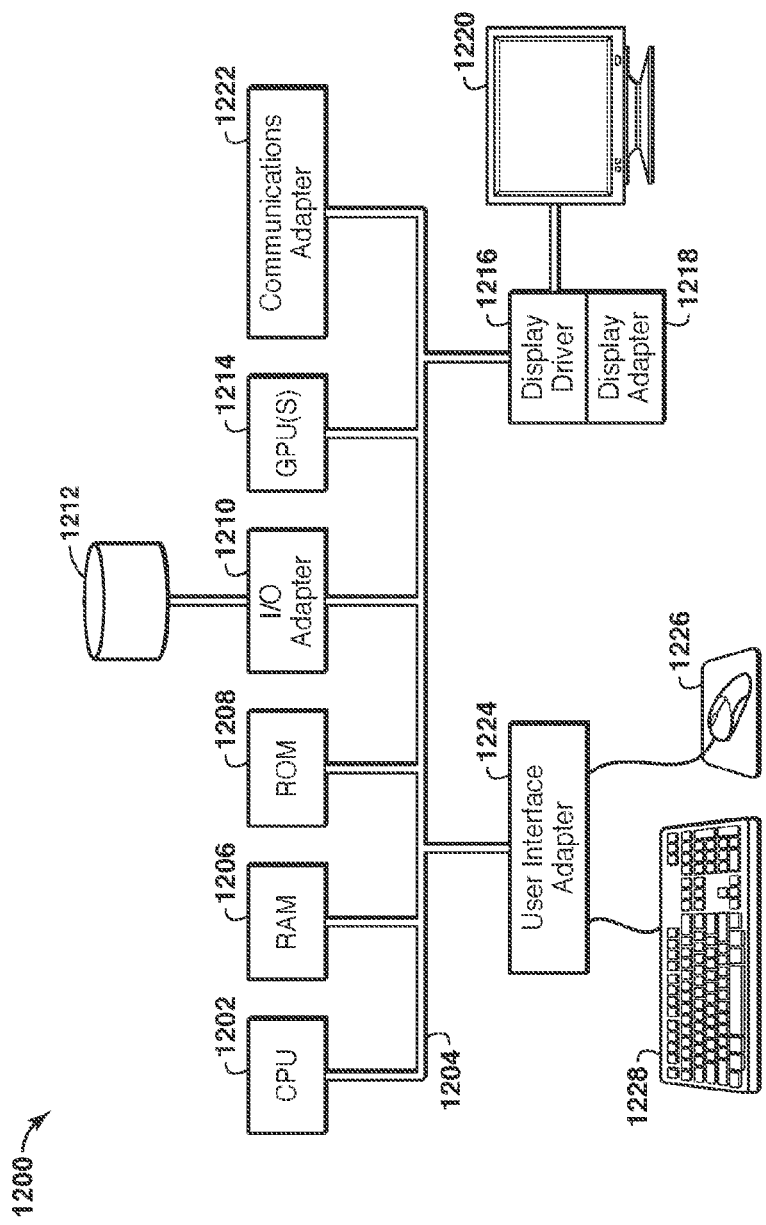
FIG. 12 is a block diagram of a computer system that may be used to perform any of the methods disclosed herein.

FIG. 12 is a block diagram of an exemplary computer system 1200 that may be used to perform any of the methods disclosed herein. A central processing unit (CPU) 1202 is coupled to system bus 1204. The CPU 1202 may be any general-purpose CPU, although other types of architectures of CPU 1202 (or other components of exemplary system 1200) may be used as long as CPU 1202 (and other components of system 1200) supports the inventive operations as described herein. The CPU 1202 may execute the various logical instructions according to disclosed aspects and methodologies. For example, the CPU 1202 may execute machine-level instructions for performing processing according to aspects and methodologies disclosed herein.

The computer system 1200 may also include computer components such as a random access memory (RAM) 1206, which may be SRAM, DRAM, SDRAM, or the like. The computer system 1200 may also include read-only memory (ROM) 1208, which may be PROM, EPROM, EEPROM, or the like. RAM 1206 and ROM 1208 hold user and system data and programs, as is known in the art. The computer system 1200 may also include an input/output (I/O) adapter 1210, GPU(s) 1214, a communications adapter 1222, a user interface adapter 1224, and a display adapter 1218. The I/O adapter 1210, the user interface adapter 1224, and/or communications adapter 1222 may, in certain aspects and techniques, enable a user to interact with computer system 1200 to input information.

The I/O adapter 1210 preferably connects a storage device(s) 1212, such as one or more of hard drive, compact disc (CD) drive, floppy disk drive, tape drive, etc. to computer system 1200. The storage device(s) may be used when RAM 1206 is insufficient for the memory requirements associated with storing data for operations of embodiments of the present techniques. The data storage of the computer system 1200 may be used for storing information and/or other data used or generated as disclosed herein. The communications adapter 1222 may couple the computer system 1200 to a network (not shown), which may enable information to be input to and/or output from system 1200 via the network (for example, a wide-area network, a local-area network, a wireless network, any combination of the foregoing). User interface adapter 1224 couples user input devices, such as a keyboard 1228, a pointing device 1226, and the like, to computer system 1200. The display adapter 1218 is driven by the CPU 1202 to control, through a display driver 1216, the display on a display device 1220. Information and/or representations of one or more 2D canvases and one or more 3D windows may be displayed, according to disclosed aspects and methodologies.

The architecture of system 1200 may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

In one or more embodiments, the method may be implemented in machine-readable logic, set of instructions or code that, when executed, performs a method to determine and/or estimate the seepage locations. The code may be used or executed with a computing system such as computing system 1200. The computer system may be utilized to store the set of instructions that are utilized to manage the data, the different measurement techniques, and other aspects of the present techniques.

As an example, a computer system for detecting hydrocarbons may include a processor; memory coupled to the processor; and a set of instructions, stored in the memory and when executed, are configured to: obtain seismic data associated with a body of water in a survey region; optionally, apply a filter to at least a portion of the seismic data to enhance diffraction anomaly signals with respect to horizontal or nearly horizontal signals associated with the water-column to form filtered seismic data; identifying noise indicators; and determine seepage locations based on comparing the seismic data with the filtered seismic data and noise indicators. The set of instructions may also be configured to apply the filter to the seismic data to maintain seismic data in the range between about 50% and about 5% of the maximum dip of a diffraction and discard data outside the range; and/or mask the seismic data from the surface of the body of water to 500 meters below the surface of the body of water; from the surface of the body of water to 700 meters below the surface of the body of water; or from the surface of the body of water to 900 meters below the surface of the body of water.

In other embodiments, the set of instructions may be specifically configured to perform other tasks. For example, the set of instructions may be configured to identify diffraction anomalies in the filtered seismic data as the seepage locations; create a satellite imagery map of the survey region; stack the seismic data prior to applying the filter on the seismic data; applying the filter to remove flat-lying energy from the seismic data and retain dip characteristic of plumes from seepage locations; applying the filter to remove horizontal signals and noises based on dip; and/or applying the filter by applying a weighted trace mix filter, wherein the trace weights sum to zero to ensure removal of flat energy.

In other embodiments, the set of instructions may be configured to validate diffraction anomalies in the filtered seismic data as the seepage locations. The validation may include: (i) identifying one or more clusters of diffraction anomalies, and comparing the one or more clusters with an expected seepage plume pattern to determine the seepage locations; (ii) identifying one or more clusters of diffraction anomalies, identifying one or more subsurface structural features in the survey region, comparing the one or more clusters with subsurface structural features to determine the seepage locations; (iii) obtaining the unstacked seismic data collocated with the anomalies, examining the unstacked data to determine the origin of the high-amplitude anomalies, and determining that the anomaly origin is consistent with a hyperbolic diffraction anomaly source; (iv) performing one or more of ocean; magnetic and gravity surveys; optical sensing survey, synthetic aperture radar slick detection and thermal anomalies detection survey to obtain measurement data, and comparing the measurement data with the filter seismic data to determine the seepage locations; and/or (v) obtaining biological and chemical samples of one or more of fluids, gases, and sediments in the survey region; identifying one or more clusters of diffraction anomalies from the filtered seismic data; comparing the one or more clusters of diffraction anomalies with the obtained biological and chemical samples to determine the seepage locations.

In one or more embodiments, the method may utilize a combination of satellite, airborne, acoustic and seismic techniques along with underwater sensors to characterize and map hydrocarbons in a marine environment. The combination of geophysical techniques along with underwater sensors provides a more complete characterization and mapping of hydrocarbons in the marine environment over play to basin scale exploration areas. As an example, the various independent technologies may include remote sensing (e.g., satellite and/or airborne), seismic and acoustic imaging (e.g., ship-based or AUV-based multibeam echo sounder, side-scan sonar, or sub-bottom profiler), magnetic and gravity surveying (either from ship, air-based tools, or AUV-based tools), chemical sensing (e.g., mass spectrometer and/or fluorometer), and sediment, biological and chemical sampling (e.g., piston cores or utilizing an underwater vehicle to obtain sediment, fluid (oil, water), and/or gas samples for noble gases and isotopologues, and biology). The method may utilize airborne vehicles and marine vessels (e.g., unmanned underwater vehicles, which may include remotely operated vehicles (ROVs) or autonomous underwater vehicles (AUVs)). When combined into an integrated method, these technologies may determine the presence and location of thermogenic hydrocarbon seepages from the seafloor to be determined.

In one or more embodiments, the method may include validating or integrating remote sensing techniques with the filtered seismic data. The remote sensor techniques may include ocean; active acoustic sensing (multibeam echo sounder, two dimensional (2D) seismic, three dimensional (3D) seismic, sub-bottom profiler, side scan sonar, etc.); imagery and spectroscopy of slicks and atmospheric gas plumes (e.g., infrared (IR) to detect atmospheric gases, radar reflectivity, etc.); towed chemical sensors (mass spectrometer, etc.); passive acoustic sensing; discrete sampling from surface vessel of air, water, or soil at various locations; drop and piston cores; magnetic and gravity surveys; optical sensing; thermal anomalies detection; and/or any other remote sensing technique. These remote sensing techniques may be performed via satellites, airborne vessels, and/or marine vessels. As an example, the filtered seismic data may be validated with multibeam backscatter data, which may provide subsurface structural features (e.g., anomalous sea-bottom hardness, roughness, and/or volumetric heterogeneity in the shallow sub-bottom and by examining the bathymetry data collected for local highs, lows, fault lines, pock marks and other geologic indicators that may be consistent with permeable pathways for hydrocarbon migration to the seafloor). Accordingly, interpretations made from these validated seepage locations may allow geologic interpretations or models to be constructed about possible hydrocarbon "plays" or prospects, based on this initial information. These potential areas may again be useful targets to determine whether thermogenic hydrocarbons are present as seeps.

In one or more embodiments, the method may include validating or integrating direct measurement techniques with the filtered seismic data. The direct measurement techniques may include deploying an underwater vehicle to a seepage location, which may be one of various seepage locations identified from the filtered seismic data, and processing the measurement data. The direct measurement techniques may include fluorescence polarization techniques, fluorometric techniques, methane or other chemical compound detection techniques (e.g., obtaining mass spectrometric data or gas chromatography (GC) data), biological and chemical sampling techniques, temperature measurement techniques, camera capturing techniques and/or other measurement components. The analysis of samples may include clumped isotope geochemistry, noble gas geochemistry, and microbiology. These analysis techniques are described in International Publication No. PCT/US2013/021258; International Publication No. PCT/US2013/033160; and International Publication No. PCT/US2012/052542.

It should be understood that the preceding is merely a detailed description of specific embodiments of the invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. The articles "the", "a" and "an" are not necessarily limited to mean only one, but rather are inclusive and open ended so as to include, optionally, multiple such elements.

The invention claimed is:

1. A method for detecting hydrocarbon seepage locations comprising:
    obtaining seismic data associated with a body of water in a survey region, said seismic data including at least a water column portion;
    applying a filter to at least a portion of the water column portion of the seismic data to enhance diffraction anomaly signals, said filter being applied with respect to horizontal or nearly horizontal signals associated with the water-column portion of the seismic data to form filtered seismic data, wherein applying the filter removes flat-lying energy from the seismic data and retains dip characteristics of plumes from hydrocarbon seepage locations;
    analyzing the water column portion of the seismic data to identify at least one noise indicator to produce a noise indicator image; and
    determining one or more hydrocarbon seepage locations on the seafloor by comparing the at least one noise indicator image to the filtered seismic data.

2. The method of claim 1, further comprising stacking the seismic data prior to applying the filter on the seismic data.

3. The method of claim 1, wherein applying the filter comprises removing horizontal signals and noises based on dip.

4. The method of claim 1, wherein applying the filter comprises applying a weighted trace mix filter, wherein the trace weights sum to zero to ensure removal of flat energy.

5. The method of claim 1, wherein applying the filter comprises processing data in the range between about 50% and about 5% of the maximum dip of the diffraction and discarding data outside the range.

6. The method of claim 1, wherein the noise indicators are used to identify at least one of reverberation noise, direct arrival noise, or water column layering noise.

7. The method of claim 1, wherein the noise indicator image is produced by at least one of rectifying the noise data, smoothing the noise data in time and space, or color mapping the data.

8. The method of claim 1, further comprising:
    analyzing the seismic data to identify at least one signal indicator to produce a signal indicator image; and
    wherein determining hydrocarbon seepage locations further comprises using the signal indicator image to identify a signal associated with a bubble plume from a hydrocarbon seepage location.

9. The method of claim 8, wherein at least one signal indicator comprises the signal velocity, a geometric property of the seismic data, or the source-receiver offset for the seismic data.

10. The method of claim 8, wherein the seismic traces are sorted by the source-receiver offset to produce the signal indicator image.

11. The method of claim 1, further comprising validating diffraction anomalies in the filtered or stacked seismic data as the seepage locations,
    wherein validating diffraction anomalies comprises:
        identifying one or more clusters of diffraction anomalies;
        identifying one or more subsurface structural features in the survey region; and
        comparing the one or more clusters with subsurface structural features to determine the seepage locations.

12. The method of claim 1, further comprising validating diffraction anomalies in the filtered or stacked seismic data as the seepage locations,
    wherein validating diffraction anomalies comprises:
        obtaining the unstacked seismic data collocated with the anomalies;
        examining the unstacked data to determine the origin of the high-amplitude anomalies; and
        determining that the anomaly origin is consistent with a hyperbolic diffraction anomaly source.

13. The method of claim 1, further comprising validating diffraction anomalies in the filtered or stacked seismic data as the seepage locations,
    wherein validating diffraction anomalies comprises:
        performing one or more of ocean; magnetic and gravity surveys; optical sensing survey, synthetic aperture radar slick detection and thermal anomalies detection survey to obtain measurement data; and
        comparing the measurement data with the modified filter seismic data to determine the seepage locations.

14. The method of claim 1, further comprising validating diffraction anomalies in the filtered or stacked seismic data as the seepage locations,
    wherein validating diffraction anomalies comprises:
        obtaining biological and chemical samples of one or more of fluids, gases, and sediments in the survey region;
        identifying one or more clusters of diffraction anomalies from the modified filtered seismic data; and
        comparing the one or more clusters of diffraction anomalies with the obtained biological and chemical samples to determine the seepage locations.

15. The method of claim 1, further comprising masking at least a portion of seismic data below the surface of the body of water.

16. The method of claim 15, wherein the masking the at least of the portion of seismic data comprises masking the seismic data from the surface of the body of water to 500 meters below the surface of the body of water.

17. A method for detecting hydrocarbon seepage locations comprising:
    obtaining seismic data associated with a body of water in a survey region, said seismic data including at least a water column portion;
    stacking the water column portion of the seismic data to produce stacked water column data;
    analyzing the seismic data to identify at least one noise indicator to produce a noise indicator image that emphasizes noise indicated by the identified at least one noise indicator; and
    determining one or more hydrocarbon seepage locations on the seafloor by comparing the at least one noise indicator image to the stacked water column data.

18. The method of claim 17, further comprising applying a filter to at least a portion of the water column portion of the seismic data to enhance diffraction anomaly signals, said filter being applied with respect to horizontal or nearly horizontal signals associated with the water-column portion of the seismic data to form filtered seismic data, wherein applying the filter removes flat-lying energy from the seismic data and retains dip characteristics of plumes from hydrocarbon seepage locations.

19. The method of claim 17, wherein the noise indicators are used to identify at least one of reverberation noise, direct arrival noise, or water column layering noise.

20. The method of claim 17, wherein the noise indicator image is produced by at least one of rectifying the noise data, smoothing the noise data in time and space, or color mapping the data.

21. The method of claim 17, further comprising:
analyzing the seismic data to identify at least one signal indicator to produce a signal indicator image; and
wherein determining hydrocarbon seepage locations further comprises using the signal indicator image to identify a signal associated with a bubble plume from a hydrocarbon seepage location.

22. The method of claim 21, wherein at least one signal indicator comprises the signal velocity, a geometric property of the seismic data, or the source-receiver offset for the seismic data.

23. The method of claim 17, further comprising validating diffraction anomalies in the stacked water column data as the seepage locations.

24. The method of claim 17, further comprising masking at least a portion of seismic data below the surface of the body of water.

* * * * *